United States Patent [19]

Fernandez

[11] 4,039,452
[45] Aug. 2, 1977

[54] SELF-CLEANING FILTER

[76] Inventor: John J. Fernandez, 1620 S. Myrtle Ave., Monrovia, Calif. 91016

[21] Appl. No.: 741,511

[22] Filed: Nov. 15, 1976

[51] Int. Cl.² .............................................. B01D 29/38
[52] U.S. Cl. .................................... 210/106; 210/117; 210/136; 210/352; 210/353; 210/356; 210/456
[58] Field of Search ............... 210/106, 109, 117, 136, 210/350, 352, 353, 356

[56] References Cited

U.S. PATENT DOCUMENTS

| 515,769 | 3/1894 | Harris | 210/352 |
|---|---|---|---|
| 1,696,313 | 12/1928 | Liddell | 210/356 |
| 1,705,908 | 3/1929 | DeWitt | 210/356 |
| 3,445,002 | 5/1969 | Muller | 210/136 |
| 3,617,551 | 11/1971 | Johnston et al. | 210/136 X |
| 3,747,769 | 7/1973 | Brumfield | 210/352 X |

Primary Examiner—Frank A. Spear, Jr.
Assistant Examiner—Richard W. Burks
Attorney, Agent, or Firm—Christie, Parker & Hale

[57] ABSTRACT

A self-cleaning filter includes a housing having a compressible filter element and a compression spring for applying spring pressure to the filter element. Unfiltered fluid, at line pressure, is forced upwardly through the filter element. Spring tension is overcome by line pressure during normal filtering operations to compress the spring and allow the filter element to maintain a relatively uncompressed condition during filtering. The spring tension is sufficient to automatically compress the filter element when line pressure is shut off to squeeze the filter element and flush out filtered particles from the filter element into a chamber below it. Separate agitators in the chamber rapidly spin and move in a random pattern throughout the chamber to keep the walls of the chamber clean from filtered particles during filtering operations. The chamber may have an automatic drain valve which automatically opens when line pressure is shut off to discharge filtered particles from the housing.

21 Claims, 3 Drawing Figures

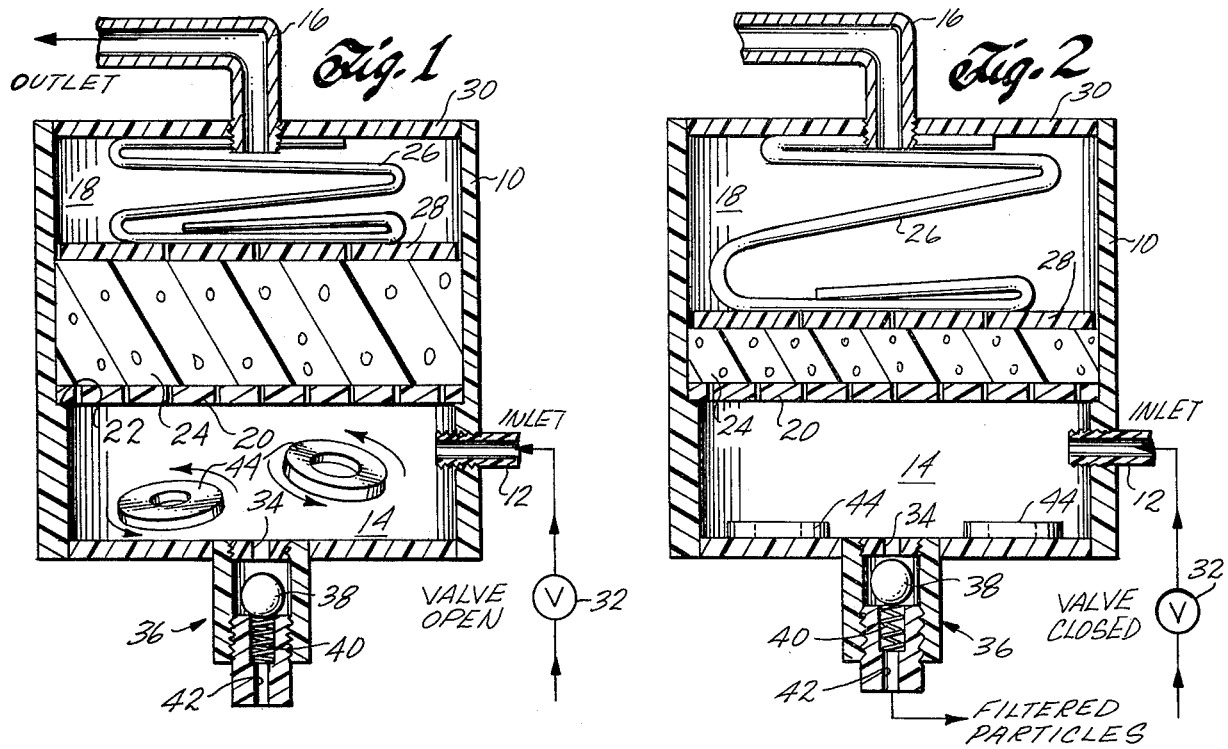
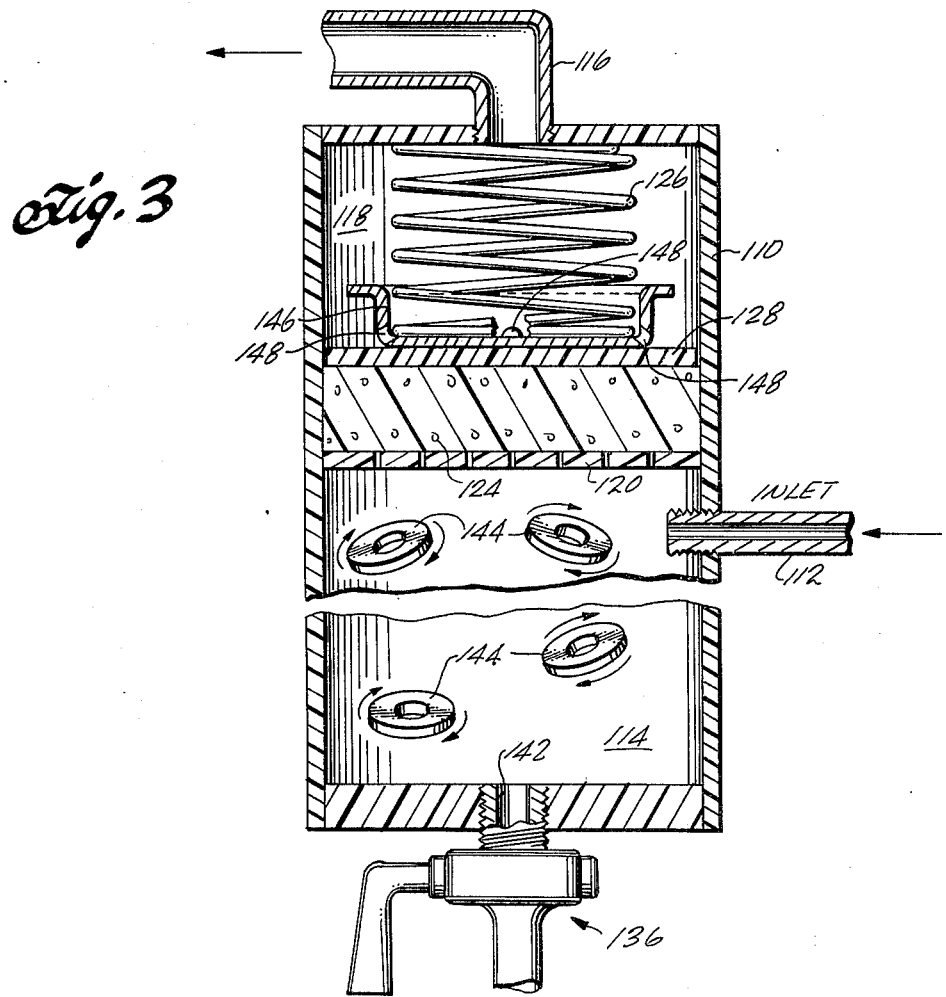

SELF-CLEANING FILTER

BACKGROUND

This invention relates to fluid filters, and more particularly to a self-cleaning filter which automatically flushes filtered matter from the filter element each time line pressure to the filter housing is shut off.

Conventional filters for filtering solid particles from oil or water, for example, for the most part comprise a filter housing having an inlet opening on one side of the filter element, and an outlet opening on the outer side of the filter element. Unfiltered fluid is forced through the filter element under pressure, and filtered matter accumulates, usually as a sediment, in a housing. A drain valve can be opened to remove the trapped sediment from the housing.

The filter elements of such filters often become clogged from the filtered matter trapped by the element. Often the efficiency of the filter is reduced appreciably after a relatively short filtering time. Many filters, such as cartridge type oil filters, solve the clogging problem by providing removable filter elements. However, it can be time-consuming and costly to constantly change filter elements in many filtering operations.

U.S. Pat. Nos. 515,769 to Harris, 3,445,002 to Muller and 3,617,551 to Johnston et al. disclose filters having compressible filter elements which can be priodically squeezed to flush filtered matter from the element. In one instance, the compressible filter element is flushed by manually squeezing it each time it is desired to clean the element. In another instance line pressure is reversed, when desired, to compress to filter element to backflush filtered matter from it. These methods of periodically cleaning the filter element avoid frequent changing of the filter element. However, in the time intervals between cleaning of the filter element, filtered matter trapped in the filter element can appreciably reduce filtering efficiency. This is especially true in microfiltration applications involving filters having micron size pores which can be rapidly clogged during use. Moreover, it can be an annoyance to require either frequent manual cleaning of the filter element or frequent adjusting of valves to backflush the filter.

The present invention provides a self-cleaning filter in which the filter element is automatically cleaned each time line pressure is shut off. Thus, in applications involving constant stopping and starting of filtering operations, the filter element remains substantially free of trapped particles. As a result, filtering efficiency is improved and filtering operations can proceed without requiring frequent changing of the filter element, manual cleaning of the filter, or reversing of line flow. The filter of this invention also allows the filter element to provide a practical means of water purification in that the pores of the filter element can be of mircon size and still operate efficiently because of its ability to remain clean during filtering operations.

SUMMARY OF THE INVENTION

Briefly, the self-cleaning filter of this invention, according to a presently preferred embodiment, comprises a filter housing having spaced apart inlet and outlet openings, and a compressible filter element in the housing between the inlet and outlet openings. Unfiltered fluid is forced under pressure through the inlet opening and through the filter element. Spring-biasing means in the housing apply a variable pressure to the compressible filter element. The spring-biasing means are responsive to fluid pressure established in the filter housing to reduce pressure on the filter element to enable the element to maintain a relatively uncompressed condition during passage of the unfiltered fluid through it. The spring-biasing means are responsive to reduction of fluid pressure in the housing to exert pressure on the filter element to compress it and thereby squeeze filtered matter from the filter element. Thus, each time the pressure of the unfiltered fluid in the housing is shut off, the spring-biasing means responds to the reduced pressure to clean the filter element; but when system pressure is established in the filter housing, the cleaned filter element assumes its normal uncompressed condition in preparation for further filtering of the incoming fluid.

In one form of the invention, an automatic drain valve on the inlet side of the filter automatically opens in response to system pressure being shut off so that filtered matter is drained from the filter each time filtering operations are stopped.

In another form of the invention, agitator means are located in a chamber of the filter housing in which filtered matter accumulates. The agitator means constantly and rapidly move in a random pattern throughout the chamber, in response to fluid pressure in the chamber, to constantly clean the walls of the chamber to prevent accumulation of filtered matter on the walls of the chamber.

These and other aspects of the invention will be more fully understood by referring to the following detailed description and the accompanying drawings.

DRAWINGS

FIG. 1 is a fragmentary cross-sectional elevation view showing a self-cleaning filter during normal filtering operations;

FIG. 2 is a fragmentary cross-sectional elevation view of the filter of FIG. 1 showing its filter element being squeezed in response to system pressure being shut off; and FIG. 3 is a fragmentary cross-sectional elevation view showing an alternate embodiment of the self-cleaning filter.

DETAILED DESCRIPTION

FIGS. 1 and 2 show a self-cleaning filter having a hollow filter housing 10 preferably in a vertical position. The filter housing is preferably circular in transverse cross-section, although other geometric shapes can be used. An inlet line 12 opens into an inlet chamber 14 in a lower portion of the filter housing; and an outlet line 16 extends into an outlet chamber 18 in an upper portion of the housing.

A perforated filter plate 20 is affixed inside the filter housing between the openings for the inlet and outlet lines. The perforated filter plate 20 is shown secured to an annular shoulder 22 extending around the I.D. of the filter housing to hold the plate 22 in a fixed position. The inlet plate can be held in its fixed position by bonding its periphery to the upright walls of the housing (if the filter plate and housing are plastic, for example); or by bonding it to the annular shoulder 22; or by threading it into engagement with cooperating screw threads (not shown) formed in the walls of the housing.

A compressible filter element 24 rests on the perforated inlet plate 20. Preferably, the filter element is made from a porous, resilient foam material such as polyurethane foam, although other cellular or fibrous compressible, porous materials may be used. The pore sizes of the compressible material are chosen in accordance with the size of the particles to be filtered. Further, several different layers of compressible filter element material may be used. For example, larger pore sections may be located below upper layers of progressively smaller pore section. The self-cleaning ability of the filter, as described below, substantially eliminates clogging of the filter element. As a result, the pores of the filter element 24 can be of micron size; and the filter of this invention can be used to filter bacteria in applications where the filter is used to purify water, for example.

The filter element 24 is held in a fixed position on the filter plate 20. Preferably, at least a portion of the periphery of the filter element 24 is sealed to the upright inside wall of the filter housing 10 above the filter plate 20. In instances where the filter components are chiefly made of plastic, a lower peripheral portion of the filter element 24, immediately above the filter plate 20, is bonded to the inside wall of the housing 10.

A coil spring 26 is located in the outlet chamber 18 to apply downward spring pressure to the compressible filter element 24. A valve plate 28 overlies the top surface of the filter element, and the bottom of the coil spring 26 bears against the top of the valve plate 24. In use, the spring 26 and valve plate 28 function as a valve to apply variable spring pressure to the compressible filter element 24. Preferably, the valve plate 28 is slightly smaller in diameter than the I.D. of the filter housing. The valve plate is perforated so that filtered fluid passing upwardly through the filter element 24 can flow either around or through the valve plate 28, through the outlet chamber 18, and through the outlet line 16. Preferably, the open spaces provided by the perforations in the valve plate 28 and the annular space around the valve plate have a smaller combined area than the area occupied by the perforations in the filter plate 20.

The coil spring 26 and valve plate 28 apply a variable spring pressure downwardly on the compressible filter element 24. The coil spring 26 is normally in compression between the valve plate 28 and a top wall 30 of the filter housing 10. The spring tension of the coil spring 26 is such that the spring will normally compress the filter element, as shown in FIG. 2, when a valve 32 in the inlet line 12 is closed and no fluid pressure is present inside the filter housing 10. However, when the valve 32 is opened and fluid pressure is established inside the filter housing, the fluid pressure in the housing overcomes the normal biasing force of the spring 26 to compress the spring, as shown in FIG. 1. This allows the compressible filter element 24 to return to its normally uncompressed original volume during filtering operations.

In use, the unfiltered fluid such as water, oil, vacuum, or other liquids or gas, enters the inlet chamber 14 under pressure through the inlet line 12. The fluid entering the filter housing may flow under gravity, under a known system pressure, or under a known vacuum. The biasing force of the spring 26 is determined in accordance with the pressure of the incoming unfiltered fluid. The unfiltered fluid is forced upwardly through the porous filter plate 20 and then through the expanded filter element 24, which is maintained in its uncompressed condition owing to the system pressure overcoming the tension in the coil spring 26. Filtered fluid passes through the outlet chamber 18 and through the outlet line 16. Filtered particles or contaminants removed from the unfiltered fluid are deposited on the lower surface of the filter plate 20, or are trapped in the lower portion of filter element 24. When fluid pressure to the filter is shut off by closing the valve 32, the spring tension in the coil spring 26 applies a downward force on the valve plate 28 to compress the filter element 24 into the position shown in FIG. 2. This automatically squeezes the filtered contaminants out of the filter element through the holes in the filter plate 20 and away from the bottom surface of the filter plate. The pressure of the squeezing action causes the filtered contaminants to be flushed into the inlet chamber 14 through a drain port 34 in the bottom of the chamber 14.

Preferably, an automatic drain valve 36 in the bottom of the inlet chamber 14 allows contaminants flushed from the filter to pass from the filter in response to the system pressure being shut off. The drain valve 36 includes a captive ball valve 38 normally biased by a coil spring 40 so as to open a drain passage 42 when system pressure is shut off, as shown in FIG. 2. When system pressure is established within the filter housing during normal filtering operations, as shown in FIG. 1, the system pressure forces the ball valve 38 downwardly to overcome the tension in spring 40 and closed off the drain passage 42.

Thus, each time system pressure is shut off, the filter element is automatically cleaned, and contaminants removed by the filter are automatically flushed out of the filter housing. This keeps the filter element constantly clean, especially in applications involving constant on-off operation of system pressure. An especially useful application of the filter is in purifying water for home use, or the like. Inasmuch as the filter is cleaned each time the water is turned off, the filter element is constantly maintained in an efficient condition. Hence, a filter element having micron sized pores can be used to effectively remove bacteria, or other similar organisms, from the water, in addition to solid contaminants, without clogging problems associated with filters which do not clean the filter element immediately after every use of the filter.

To provide a further cleaning action, a number of agitator elements 44 are located in the inlet chamber 14. The agitator elements 44 preferably are shaped as round washers each having a central opening. The system pressure during filtering operations causes the agitator elements 44 to spin rapidly and move rapidly in a random motion throughout the inlet chamber 14 as long as system pressure is present in the filter housing. The spinning agitators constantly contact the walls of the inlet chamber 14 to continuously prevent contaminants from accumulating on the walls of the chamber. I have discovered that use of the agitator elements 44 in my water purifying filter keeps the inlet chamber walls clean from scale buildup over an indefinite period of time. In contrast, the same filter used without the agitator elements experience scale buildup in a relatively short time.

FIG. 3 shows an alternate embodiment of the filter of this invention. The filter shown in FIG. 3 operates according to the same self-cleaning principle of the filter shown in FIGS. 1 and 2. That is, the compressible filter element 124 is squeezed under the force applied to it by the coil spring 126 each time hydraulic pressure within the filter is shut off. The filter shown in FIG. 3 is especially useful as an oil filter in similar applications involving the filtering of solid contaminants from viscous liquids. The filter is especially practical as an oil filter for automobile engines, or the like, inasmuch as the filter element 124 is automatically self-cleaned each time the automobile engine is stopped. Thus, the useful life of the filter can be prolonged almost indefinitely, and the filter can be manufactured as a sealed unit not requiring frequent changes of the filter element. When used as an oil filter, or in similar applications, a manual drain valve 136 is provided in the bottom of the inlet chamber 114. The inlet chamber 114 is substantially longer than the outlet chamber 118, preferably having a volume about three times that of the outlet chamber 118. The longer inlet chamber 114 provides a reservoir in which sediment removed by the filter can accumulate between periodic removal of the sediment via the manually operated drain valve 136. The spinning agitators 144 in the chamber 114 keep the removed contaminants constantly in suspension in the oil during filtering, which forces the contaminants to settle to the bottom of the inlet chamber 114 when the oil pressure is shut off.

In using the filter of FIG. 3 to filter contaminants from viscous liquids such as oil, an essentially unperforated valve plate 128 is used to increase the spring pressure applied to the filter element by the spring 126 so that a strong squeezing pressure is applied to the filter element 124 each time system pressure is stopped. In such applications, it is preferred that the spring 126 be disposed in a cup-like valve seat 146 overlying the top surface of the valve plate 128. The valve seat 146 may have a number of bypass holes 148 to allow for passage of the filtered oil through the outlet chamber 118. The open area provided by the bypass holes 148, and openings in the valve plate 128, if any, is preferably less than about 20% of the open area in the filter plate 120. As an alternate means for increasing the squeezing pressure on the filter element 124, the biasing force of the coil spring 126 can be increased.

Thus, the self-cleaning filter of this invention is automatically cleaned each time system pressure is shut off, and the filter is especially useful in applications, such as oil filters for automobiles or water purifying filters for home use, where the supply of fluid to be filtered is constantly being turned on and off. The filter of this invention maintains such a high degree of self-cleaning efficiency that it can be used for micro-filtration applications. Further, the filter can be used as a sealed unit requiring essentially no changing of the filter element during the useful life of the filter, as well as avoiding time-consuming manual cleaning or backflushing of the filter.

I claim:
1. Self-cleaning filtration apparatus comprising:
   a filter housing having spaced apart inlet and outlet openings;
   a compressible filter element in the housing between the inlet and outlet openings;
   means for introducing an unfiltered fluid under pressure into the housing through the inlet opening so that the fluid flows through the filter element and filtered fluid flows through the outlet opening;
   spring-biasing means in the housing for applying variable pressure to the compressible filter element;
   the spring-biasing means being responsive to fluid pressure established in the filter housing to reduce pressure on the filter element to enable the filter element to maintain a relatively uncompressed normal condition during passage of the filtered fluid through it;
   the spring-biasing means being responsive to reduction of fluid pressure in the housing to apply pressure to the filter element to compress it and thereby squeeze filtered matter from the filter element.

2. Apparatus according to claim 1 in which the filter housing has an inlet chamber communicating with the inlet opening, and an outlet chamber communicating with the outlet opening; and in which the filter element is located between the inlet and outlet chambers, and in which filtered matter squeezed from the filter element accumulates in the inlet chamber.

3. Apparatus according to claim 2 in which the spring-biasing means are located in the outlet chamber.

4. Apparatus according to claim 2 including agitator means for moving in a random manner throughout the inlet chamber in response to fluid pressure in the housing to clean the walls of the inlet chamber.

5. Apparatus according to claim 2 including a fixed perforated filter plate supporting the filter element in a fixed position in the housing so that fluid entering the inlet opening flows through the filter plate and then through the filter element.

6. Apparatus according to claim 5 including a movable perforated valve plate in contact with a side of the filter element opposite the filter plate; and in which openings in the movable valve plate occupy a relatively smaller area than openings in the filter plate.

7. Apparatus according to claim 6 in which the open areas in the movable valve plate occupy less than about 20% of the area occupied by openings in the filter plate.

8. Apparatus according to claim 6 in which the spring-biasing means applies force to the movable valve plate to compress the filter element.

9. Apparatus according to claim 5 in which the periphery of the filter element is sealed to the inside wall of the filter housing.

10. Apparatus according to claim 2 including drain valve means opening through a lower portion of the inlet chamber, the drain valve means being operative, in response to said reduction of fluid pressure in the filter housing, to open and allow filtered matter in the inlet chamber to pass through it, the drain valve means also being operative in response to said fluid pressure established in the filter housing to automatically close during normal filtering operations.

11. Apparatus according to claim 2 including a drain valve in a lower portion of the inlet chamber for being selectively opened to discharge from the housing filtered matter accumulated in the inlet chamber.

12. Apparatus according to claim 1 in which the filter element is made of a resilient foam material.

13. Apparatus according to claim 1 in which the spring-biasing means comprises a compression spring extending between a wall of the filter housing and the filter element on the side thereof remote from the inlet opening; and including means for introducing unfiltered fluid through the inlet opening under a known line pressure, the compression spring having a known spring force for applying spring tension to the filter element, the spring tension being overcome by the line pressure during normal filtering operations so that the compression spring is relatively compressed and the filter is relatively uncompressed during filtering operations, the spring tension being sufficient to automatically compress the filter element when fluid pressure within the housing is reduced to zero.

14. Apparatus according to claim 13 in which the filter element has a first side adjacent the inlet opening and a second side adjacent the outlet opening; and further including a first perforated plate overlying the first side of the filter element, and a second perforated plate overlying the second side of the filter element; and in which the spring applies force to the second perforated plate toward the compressible filter element.

15. Apparatus according to claim 14 in which perforations in the second plate offer a greater resistance to fluid flow through the filter than the perforations in the first plate.

16. Apparatus according to claim 14 in which the filter element is made from a resilient foam material.

17. Apparatus according to claim 14 in which the perforations in the second plate occupy less than about 20% of the area of the perforations in the first plate.

18. Apparatus according to claim 14 in which the first plate is in a fixed position in the filter housing, and the periphery of the compressible filter element is sealed to the inner walls of the housing.

19. Apparatus according to claim 18 in which the inlet opening opens into an inlet chamber within the filter housing; and including agitator means for moving in a random pattern throughout the inlet chamber in response to fluid pressure in the housing to clean the walls of the inlet chamber.

20. Apparatus according to claim 13 in which the inlet opening opens into an inlet chamber within the filter housing; and including agitator means for moving in a random pattern throughout the inlet chamber in response to fluid pressure in the housing to clean the walls of the inlet chamber.

21. Apparatus according to claim 13 in which the inlet opening opens into an inlet chamber within the filter housing; and including drain valve means opening through a lower portion of the inlet chamber, the drain valve means being operative, in response to said reduction of fluid pressure in the filter housing, to open and allow filtered matter in the inlet chamber to pass through it, the drain valve means also being operative in response to said fluid pressure established in the filter housing to automatically close during normal filtering operations.

* * * * *